United States Patent [19]

Ueyama

[11] Patent Number: 5,075,709
[45] Date of Patent: Dec. 24, 1991

[54] CAMERA WITH A ZOOM LENS

[75] Inventor: Masayuki Ueyama, Osaka, Japan

[73] Assignee: Minolta Camera Kabushiki Kaisha, Osaka, Japan

[21] Appl. No.: 466,775

[22] Filed: Jan. 18, 1990

[30] Foreign Application Priority Data

| Jan. 19, 1989 | [JP] | Japan | 1-5349[U] |
| Jan. 19, 1989 | [JP] | Japan | 1-11376 |
| Jan. 19, 1989 | [JP] | Japan | 1-11377 |
| Jan. 19, 1989 | [JP] | Japan | 1-11378 |
| Jan. 19, 1989 | [JP] | Japan | 1-11379 |

[51] Int. Cl.$^5$ ............................................. G03B 1/18
[52] U.S. Cl. .................................. 354/195.1; 354/400
[58] Field of Search ............... 354/400, 402, 195.1, 354/401, 403-409

[56] References Cited

U.S. PATENT DOCUMENTS

| 3,972,056 | 7/1976 | Tsujimoto et al. | 354/195.1 |
| 4,043,642 | 8/1977 | Hirose et al. | 354/195.1 |
| 4,474,447 | 10/1984 | Kawabata et al. | 354/409 X |

FOREIGN PATENT DOCUMENTS

| 51-3226 | 5/1975 | Japan . |
| 52-15226 | 4/1977 | Japan . |
| 52-114321 | 9/1977 | Japan . |
| 56-47533 | 11/1981 | Japan . |
| 63-182620 | 7/1988 | Japan . |

Primary Examiner—Brian W. Brown
Assistant Examiner—Khanh Dang
Attorney, Agent, or Firm—Burns, Doane, Swecker & Mathis

[57] ABSTRACT

A camera with a zoom lens for keeping in focus at a moving (proceeeding to or receding from the lens) object while the lens is zoomed and the magnification of the object is maintained constant. In the process, at every focal length of the zoom lens, the focusing lens group is shifted from a predetermined position (in an embodiment, it is the position of the focusing lens group where an object at infinity is focused on the film surface) by a distance $C\cdot\beta$, where C is a constant and $\beta$ is the maintained magnification. The constant C depends on the lens configuration; two examples are shown in the description of the embodiments.

33 Claims, 14 Drawing Sheets

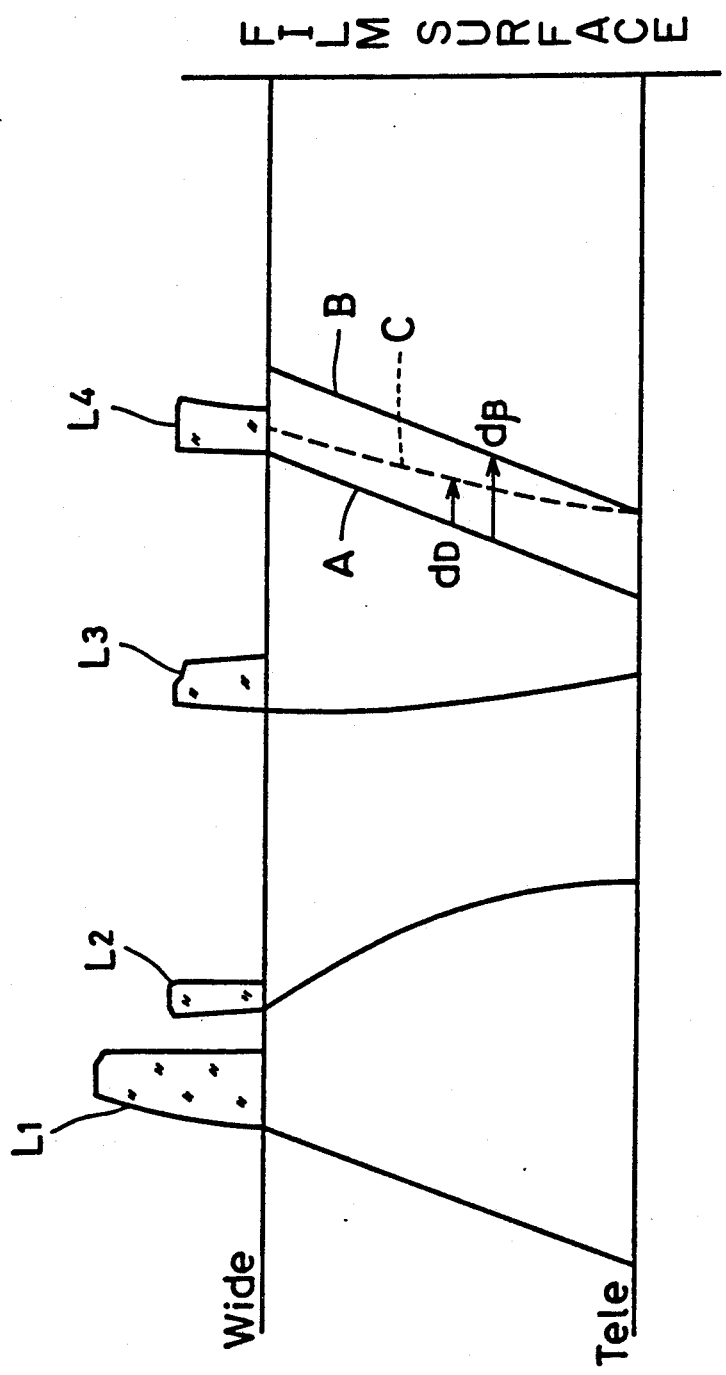

CAMERA WITH A ZOOM LENS

The present invention relates to a camera with a zoom lens that can keep infocus an object proceeding to or receding from the lens while the lens is zoomed so that the magnification of the object is maintained constant.

BACKGROUND OF THE INVENTION

Zoom lenses of conventional cameras operate so that the magnification of an object standing at a certain fixed distance is varied during zooming ("normal zooming mode").

When a photographer wants to use a zoom lens to keep up with a moving object (i.e., a proceeding or receding object) while maintaining the magnification constant ("constant magnification zooming mode"), it has been necessary to simultaneously operate the zooming and focusing in order to keep the moving object infocus. Practically, however, it is very difficult to deliberately operate both the zooming ring and focusing ring simultaneously.

SUMMARY OF THE INVENTION

An object of hte present invention is therefore to provide a camera with a zoom lens in which zooming and focusing are cooperatively performed by the photographer's one operation in both normal zooming mode and constant magnification zooming mode.

Another object of the present invention is to provide a zoom lens that can operate in, besides the normal zooming mode, the constant magnification zooming mode, in which a moving object is automatically kept infocus while zooming is performed with the magnification maintained constant.

These and other objects are achieved by the camera of the present invention which is operable in two zooming mode: a first zooming mode in which a moving object is kept infocus with the magnification maintained constant during zooming, and a second zooming mode in which an object standing at a fixed distance is kept infocus during zooming. The camera according to the invention comprises: mode selecting means for selecting one of the first and second zooming modes; a lens group for projecting an image of an object onto an image plane with various focal lengths; lens movement controlling means for determining a position of the lens group so that a moving object is kept infocus with the magnification maintained constant during zooming; and correcting means for correcting the position of the lens group that is determined by the lens movement controlling means in the second zooming mode so that an object standing at a fixed distance is kept infocus during zooming.

Further features of the invention are detailed in the description of the preferred embodiments that follows.

BRIEF DESCRIPTION OF THE ATTACHED DRAWINGS

FIG. 1 is a schematic view of the lens groups of a zoom lens system according to an embodiment of the present invention, and the graph of their movements between the shortest and longest focal lengths.

DESCRIPTION OF THE PREFERRED EMBODIMENTS

The first embodiment of the present invention is now described referring to FIGS. 1 through 9.

MOVEMENT OF LENS GROUPS DURING ZOOMING

FIG. 1 shows a configuraiton and movement of a zoom lens adaptable to a camera according to the present invention. The zoom lens includes four components (lens groups) $L_1$, $L_2$, $L_3$ and $L_4$; the lens groups have, respectively from the object side to the image side: positive, negative, positive and negative refractive powers. When the zoom lens is zoomed from wide position (shorter focal length) to tele position (longer focal length) with infocus at infinity, the front three lens groups $L_1$, $L_2$ and $L_3$ move as shown by respective solid lines in FIG. 1, and the fourth lens group $L_4$ moves on the line A. The movement of the fourth lens group $L_4$ is for ordinary image focusing and also for compensating for the shift of the focal point during zooming. When the zoom lens is zoomed, for example, from wide position to tele position keeping infocus at an object moving backward with the magnificaiton maintained constant, the movement line of the fourth lens group $L_4$ shifts form line A to line B. Line B keeps a constant distance from line A toward the camera body, where the distance $d\beta$ depends on the magnification maintained. When the lens is zoomed, on the other hand, from wide to tele keeping infocus at an object standing at a certain distance, the fourth lens group $L_4$ moves on the dash line C. Line C is shifted from line A toward the camera body increasingly from wide to tele, and the shift $d_D$ depends on the focal length f of the zoom lens.

DESIGNING THE ZOOM LENS

Figure 2A:
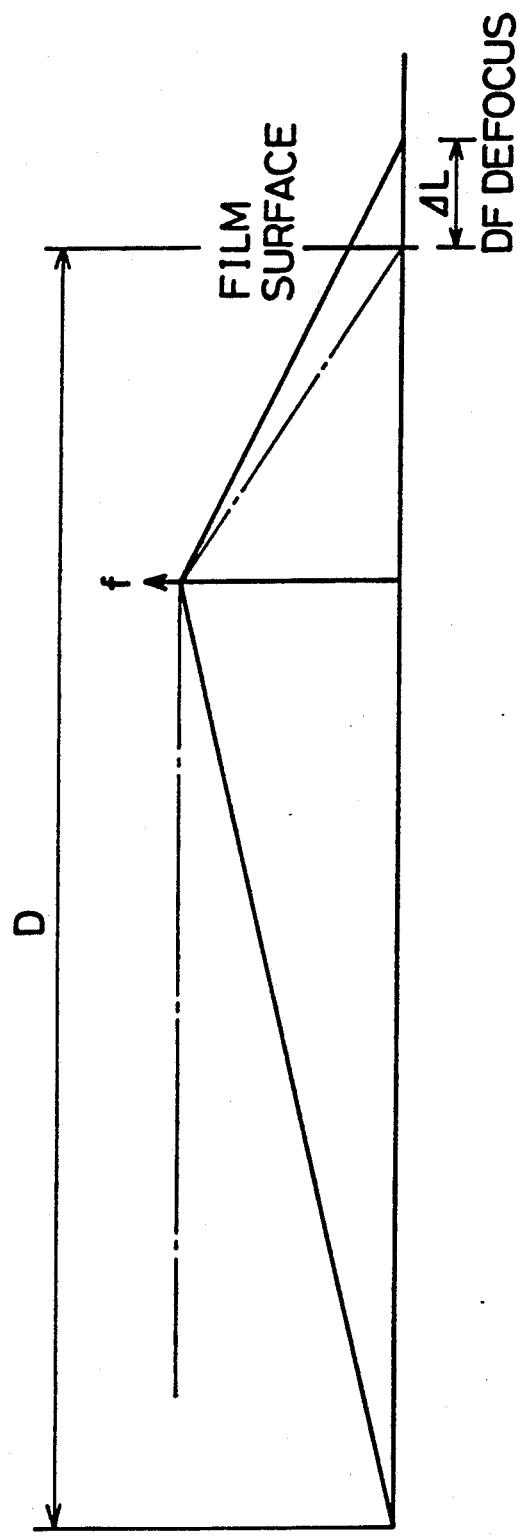
FIGS. 2(a) and 2(b) are ray trace diagrams of a simplified lens system explaining the lens movement.

A design process of the zoom lens is now explained with reference to FIGS. 2(a) and 2(b). In FIG. 2(a), the zoom lens system having a focal length f is represented by a single positive lens, and the chain line represents a ray from an object at infinity focusing on the film surface (image plane). When the object comes to distance D from the film surface, the ray trace changes to as shown by the solid line, yielding a defocus $\Delta L$. When $D >> f$, $\Delta L$ is given by $$\Delta L = -f \cdot \beta, \quad (1)$$

where $\beta$ is the lateral magnification and the minus sign means that the image is upside-down.

Figure 2B:
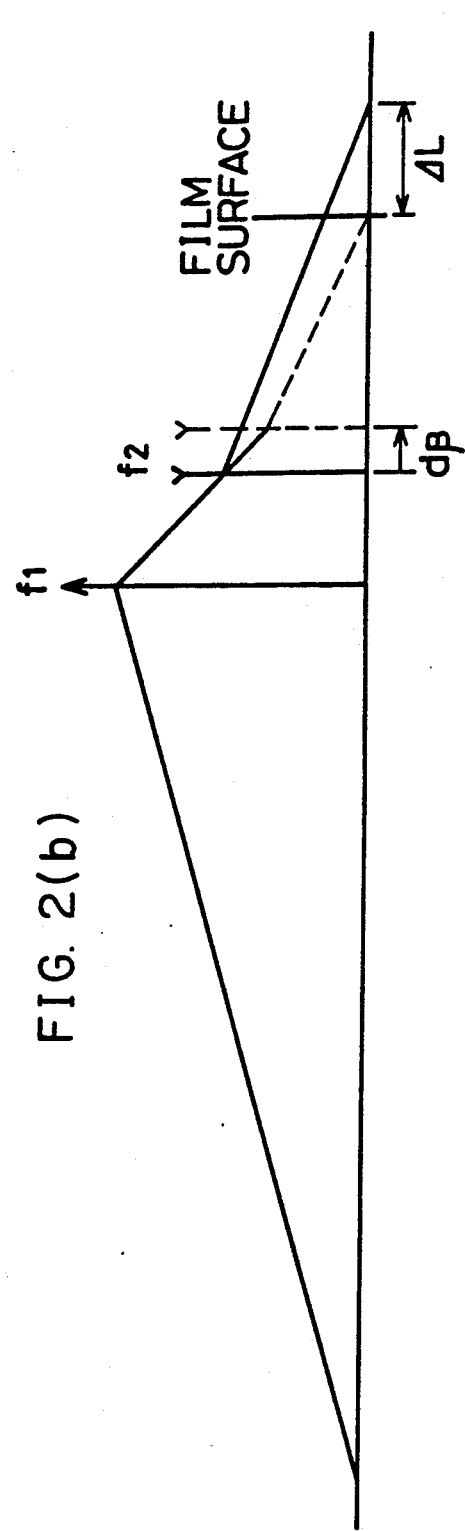
Figure 3:
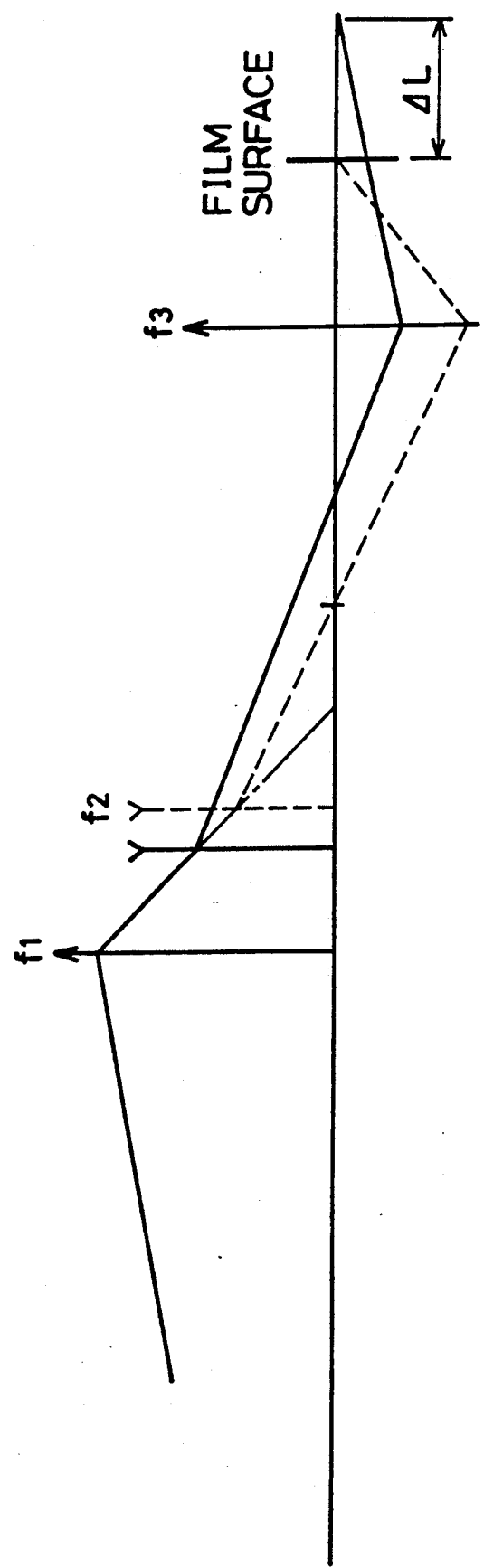
FIG. 3 is a ray trace diagram of another simplified lens system.

In FIG. 2(b), the zoom lens system is composed of two lens groups: a front lens group $f_1$ and a rear lens group $f_2$ for focusing. The front lens group $f_1$ of FIG. 2(b) corresponds to the first $L_1$, second $L_2$ and third $L_3$ lens groups of FIG. 1, and the rear lens group $f_2$ to the fourth lens group $L_4$. The ray trace in FIG. 2(b) is for an object at distance D. In order to compensate for the defocus $\Delta L$, the focusing (rear) lens group is moved by the distance $d\beta$ toward the image film surface, as shown by the dash line. When the magnification of the focusing lens group at the time the zoom lens is infocus at infinity is $\beta_2$, the longitudinal magnification $\gamma_2$ of the image is given by:

$$\gamma_2 = \beta_2{}^2 = (d\beta - \Delta L)/d\beta. \quad (2)$$

This gives:

$$d\beta = \Delta L/(1 - \beta_2{}^2) \quad (3)$$

and, by substituting equation (1), $$d\beta = -f \cdot \beta/(1 - \beta_2{}^2). \quad (4)$$

This means that by keeping the value $f/(1-\beta_2{}^2)$ constant, i.e. by shifting the focusing lens groups by distance:

$$d\beta = C \cdot \beta, \quad (5)$$

where $C = f/(1-\beta_2{}^2)$ (constant), from the position infocus at infinity, the object at distance D is kept infocus during zooming. As shown by equation (5), the shift $d\beta$ depends on the image magnification $\beta$ and a constant. Thus the pertinent zoom lens is basically designed.

Actually, first, every position of the focusing lens group is determined so that an object at infinity is infocus for every focal length of the zoom lens (i.e., line A of FIG. 1). Precisely, the focusing lens magnification $\beta_2$ is determined based on a focal length f of the zoom lens and the constant C. Then the distance of the focusing lens group from the film surface is determined based on the magnification $\beta_2$ and the preset focal length $f_2$ of the focusing lens group. By similarly determining the distance for every focal length f of the zoom lens, the position of the focusing lens group for any value of f (line A) is determined. Then the positions of the first, second and third lens groups $L_1$, $L_2$ and $L_3$ are determined for every value of f so that the compound focal length of $f_1$ and $f_2$ becomes f and the zoom lens is infocus at infinity. That is, the positions are determined so that:

$$f_1 = f/\beta_2.$$

and the light from an object at infinity is focused on the object point of the focusing lens group which is focusing on the film surface. By these measures, the infocus condition is maintained while zooming at a constant magnification $\beta$ by shifting the focusing lens group by the distance $C \cdot \beta$ from the position infocus at infinity (line A). Precisely saying, the value $f/(1-\beta_2{}^2)$ changes slightly because the focusing lens group moves during zooming, but the effect is practically negligible if the movement is made relatively small. An example of the design values are shown in Table 1.

TABLE 1

|  |  | 105 | 142 | 188 |
|---|---|---|---|---|
| f |  | 105 | 142 | 188 |
| $e_1$ |  | 9.02 | 37.7 | 71.2 |
| $e_2$ |  | 43.22 | 26.4 | 10.3 |
| $e_3$ |  | 35.3 | 24 | 8 |
| shift of | $\beta = -0.05$ | 3.01 | 3.00 | 3.01 |
| focus position | $\beta = -0.1$ | 6.37 | 6.27 | 6.25 |
| $\beta_2$ |  | 1.683 | 1.859 | 2.057 |
| $f/(1 - \beta_2{}^2)$ |  | −57.417 | −57.681 | −58.275 |

In Table 1, $e_1$, $e_2$, and $e_3$ are distances $L_1$-$L_2$, $L_2$-$L_3$, and $L_3$-$L_4$ between adjacent lens groups near the optical axis, and the compound refractive powers $\phi_1$, $\phi_2$, $\phi_3$ and $\phi_4$ of the respective lens groups $L_1$, $L_2$, $L_3$ and $L_4$ are: $\phi_1 = 0.0076$, $\phi_2 = -0.00865$, $\phi_3 = 0.0173$, and $\phi_4 = -0.0168$.

There are many other design methods than as described above. For example, a third lens group $f_3$ can be added behind the focusing lens group, as in FIG. 3. In this case, the equation (1) persists but the defocus amount $\Delta L$ for an object at distance D should be multiplied by $1/\beta_3{}^2$, where $\beta_3{}^2$ is the longitudinal magnification $\gamma_3$ of the additional lens group. Therefore, the movement $d\beta$ of the focusing lens group necessary to eliminate the defocus $\Delta L$ is given by:

$$d\beta = \Delta L/\{(1 - \beta_2{}^2)\beta_3{}^2\} \quad (3')$$

$$= -f \cdot \beta/\{(1 - \beta_2{}^2)\beta_3{}^2\}. \quad (4')$$

That is, $f/\{(1-\beta_2{}^2)\beta_3{}^2\} = C'$ should be maintained during zooming. In this case, first the position of the additional lens group is determined for every value of focal length f of the zoom lens, and the position of the additional lens group and its focal length $f_3$ determine the magnification $\beta_3$. Then $\beta_2$ of the focusing lens group is determined from the values f, $C'$ and $\beta_3$ based on the above equation, and the position of the focusing lens group is given. Finally, the positions of the first, second and third lens groups $L_1$, $L_2$ and $L_3$ are determined so that the compound focal length of the three lens groups becomes f and an object at infinity is focused on the film surface.

Figure 4:
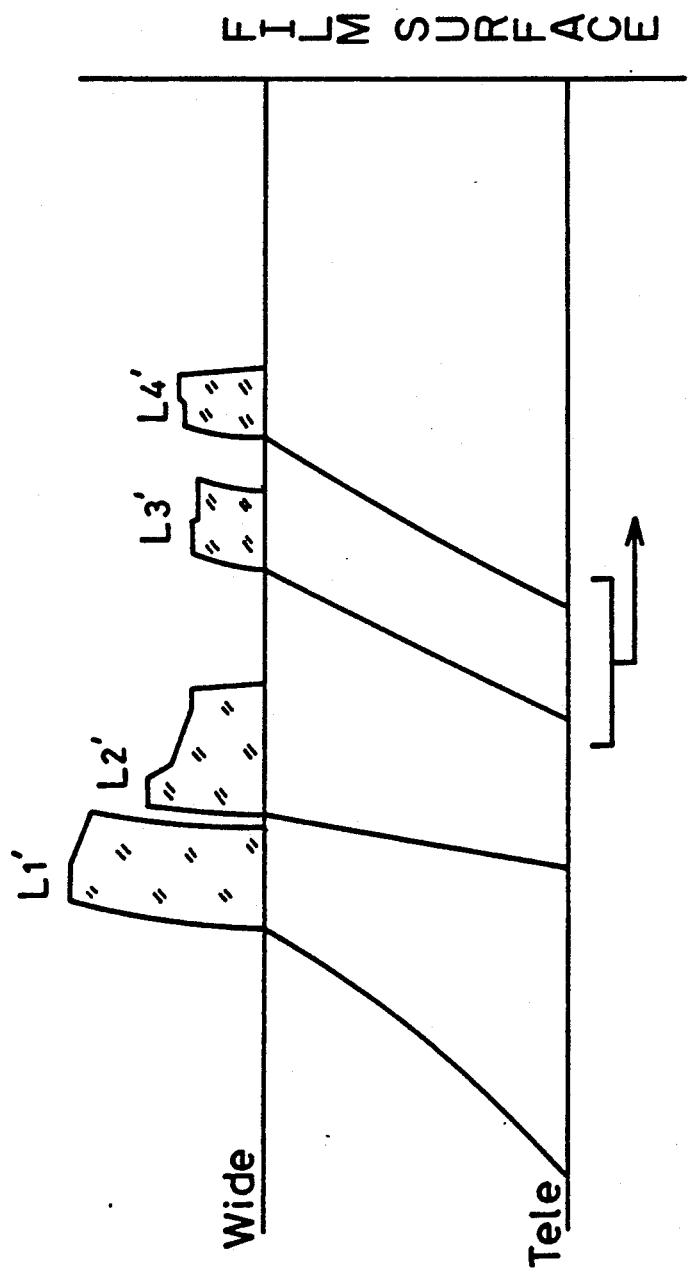
FIG. 4 shows lens group movements of another zoom lens configuration.

Further design freedom can be obtained by dividing the focusing lens group into plural lens groups to vary the focal length $f_2$ during zooming. FIG. 4 shows the case where the focusing lens group is composed of two lens groups $L_3'$ and $L_4'$. In this case, infocus condition is kept during zooming by changing the distance between the two lens groups $L_3'$ and $L_4'$, thus altering the compound focal length $f_2$. Normal focusing is performed by moving the two lens groups $L_3'$ and $L_4'$ as a whole. An example of the design values are shown in Table 2.

TABLE 2

|  |  | 30.9 | 52 | 105.4 |
|---|---|---|---|---|
| f |  | 30.9 | 52 | 105.4 |
| $e_1$ |  | 10.259 | 26.009 | 38.659 |
| $e_2$ |  | 16.384 | 12.134 | 4.984 |
| $e_3$ |  | 22.812 | 14.412 | 13.712 |
| shift of | $\beta = -0.05$ | −1.81 | −1.84 | −1.84 |
| focus position | $\beta = -0.1$ | −4.21 | −4.09 | −3.91 |
| $\beta_2$ |  | −1.392 | −1.588 | −1.999 |
| $f/(1 - \beta_2{}^2)$ |  | −33.0 | −34.1 | −35.2 |

In Table 2, $e_1$, $e_2$, and $e_3$ are distances $L_1$-$L_2$, $L_2$-$L_3$, and $L_3$-$L_4$ between the adjacent lens groups near the optical axis, and the compound refractive powers $\phi_1$, $\phi_2$, $\phi_3$ and $\phi_4$ of the respective lens groups $L_1$, $L_2$, $L_3$ and $L_4$ are: $\phi_1 = 0.0135$, $\phi_2 = -0.0679$, $\phi_3 0.0278$, and $\phi_4 = 0.0204$.

MECHANICAL STRUCTURE

Figure 5:
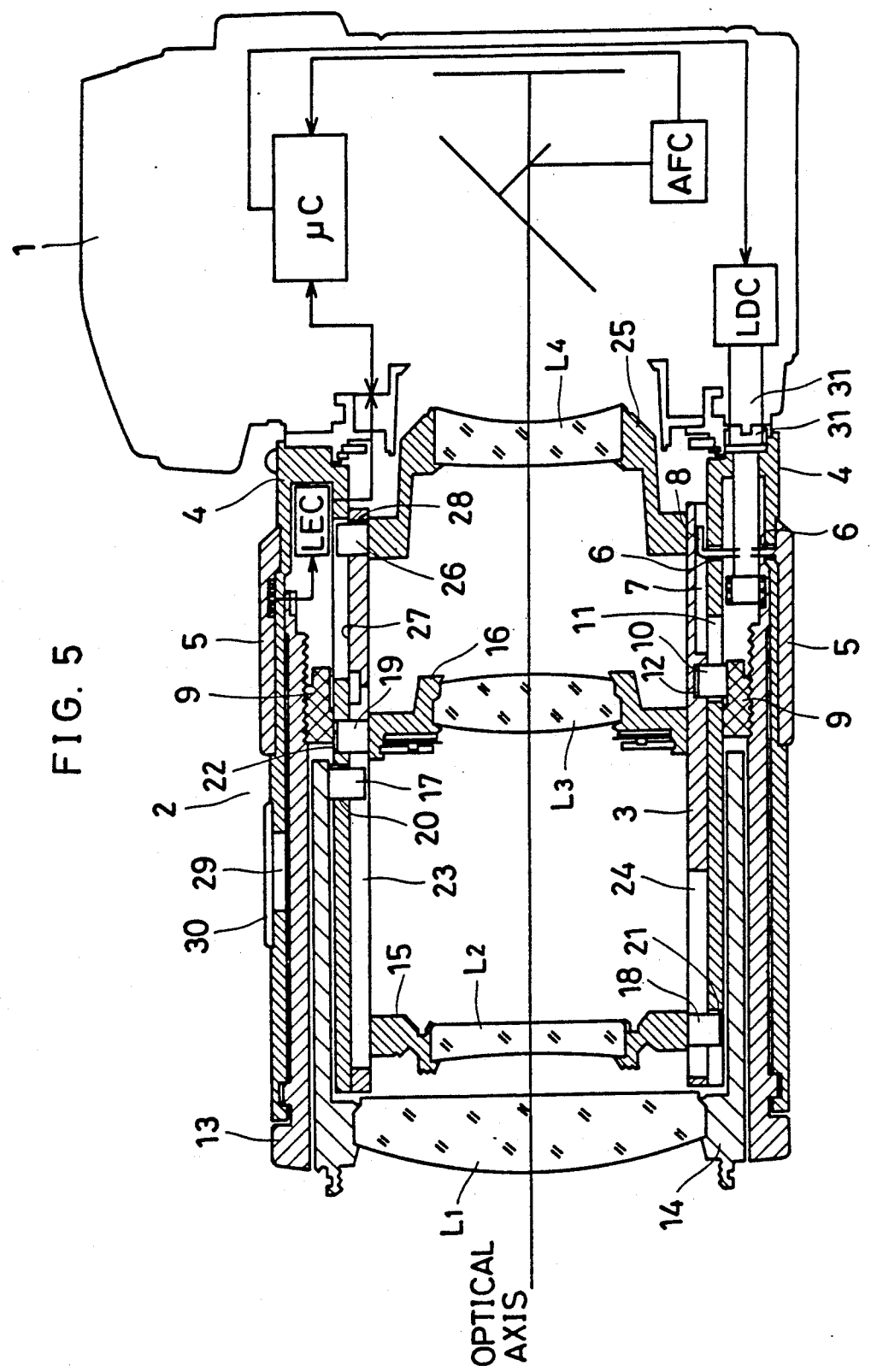
FIG. 5 is a cross sectional view of a camera system with a zoom lens unit having the optical structure as shown in FIG. 1, as the first embodiment of the present invention.

FIG. 5 is a cross-sectional view of the camera system of the present embodiment equipped with a zoom lens unit 2 having an optical system as shown in FIG. 1. The zoom lens unit 2 attached on a camera body 1 has a cam ring 3 rotatable and longitudinally movable in a fixed cylinder 4 along the optical axis. A zooming ring 5 is manually rotatable on the fixed cylinder 4 and is linked to the cam ring 3 by means of a link pin 8 penetrating through an arcuate circumferential slot 6 in the fixed cylinder 4 into a longitudinal groove 7 on the cam ring 3, whereby the zooming ring 5 and the cam ring 3 rotates together while allowing longitudinal movement of the cam ring 3. A shifting ring 9 is linked to the cam ring 3 by means of a guide pin 10 penetrating through a longitudinal slot 11 in the fixed cylidner 4 into an arcuate circumferential groove 12 on the cam ring 3, whereby the shifting ring 9 is allowed to move only longitudinally along the optical axis following the cam ring 3. A focusing ring 13 is linked to the shifting ring 9 by a helicoid coupling and is manually rotatable on the fixed cylinder 4 to move the shifting ring 9 along the optical axis.

Figure 6:
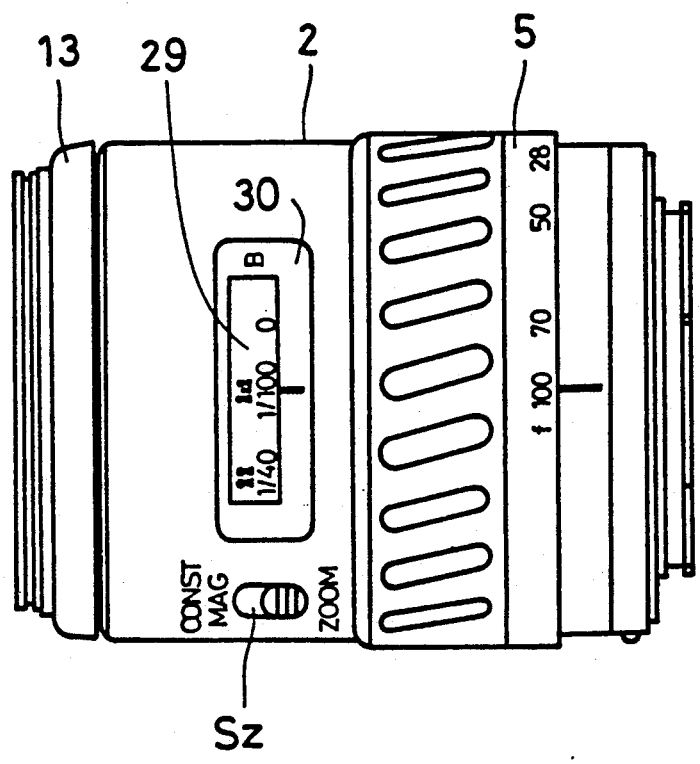
FIG. 6 is an external view of the zoom lens unit.

$L_1$, $L_2$ and $L_3$ are variator lens groups. The lens groups $L_1$, $L_2$ and $L_3$ are supported by respective frames 14, 15 and 16, and the frames 14, 15 and 16 have respective guide pins 17, 18 and 19. The guide pins 17, 18 and 19 are fitted into longitudinal slots 23 and 24 in the cam ring 3 and into respective cam grooves 20, 21 and 22 engraved on the fixed cylinder 4. The lens groups $L_1$, $L_2$ and $L_3$ do not follow a longitudinal movement of the cam ring 3, but moves as shown in FIG. 1 according to the shape of the cam grooves 20, 21 and 22 when the cam ring 3 is rotated. $L_4$ is the fourth lens group for focusing and compensating for the focus shift during zooming. The fourth lens group $L_4$ follows a longitudinal movement of the cam ring 3, and also moves as shown in FIG. 1 when the cam ring 3 is rotated by means of a cam 28. A coupler 31 is provided in the camera body 1 for transmitting motor drive to the focusing ring 13 to effect an auto-focusing function of the camera system. A magnification scale 29 is inscribed on the periphery of the focusing ring 13, and a window 30 is provided to look into the scale 29 from outside, which are better shown in FIG. 6. A zoom mode switch $S_Z$ is shown in FIG. 6.

ELECTRICAL STRUCTURE

Figure 7:
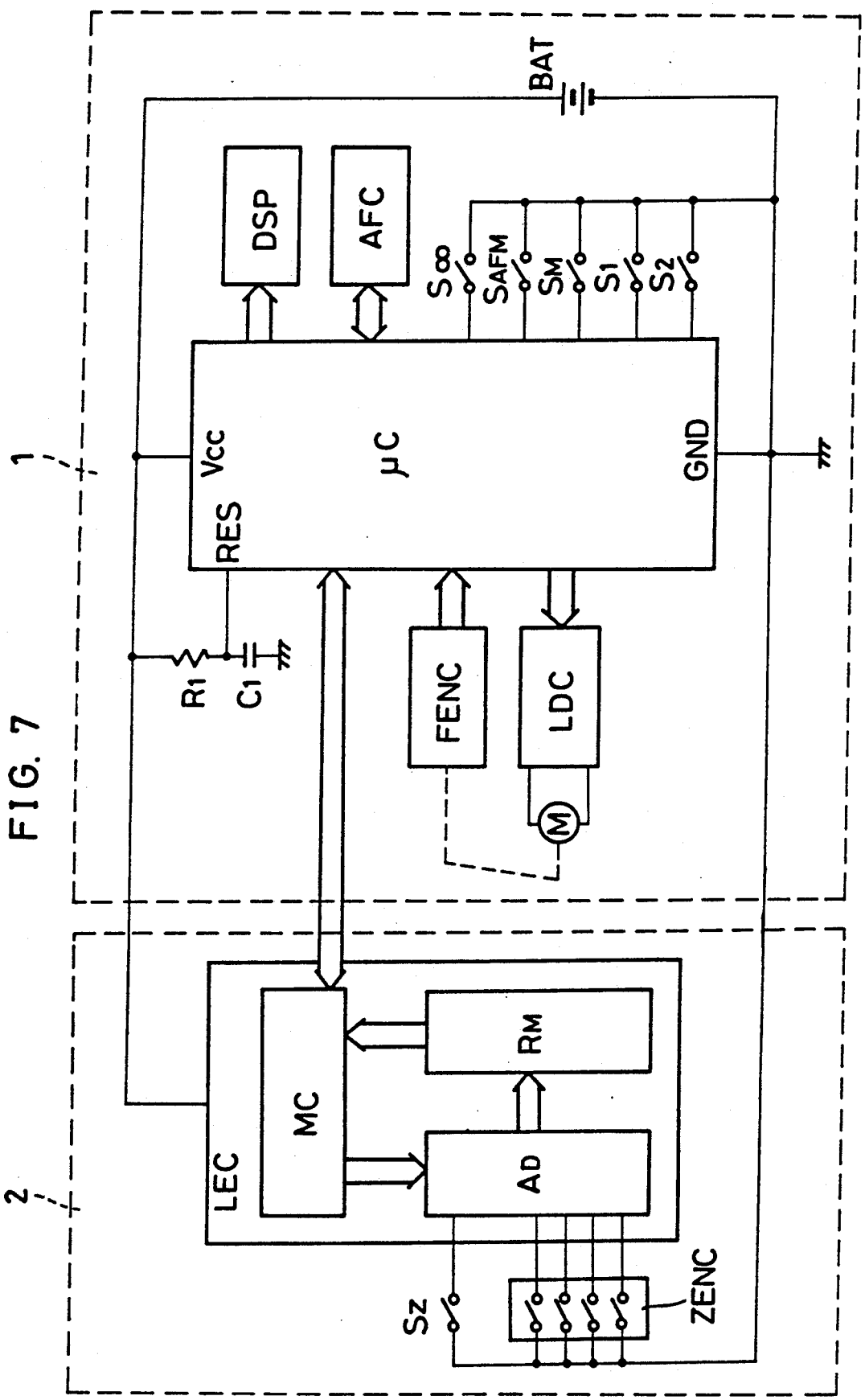
FIG. 7 is a block diagram representing the electrical system of the first embodiment.

FIG. 7 shows the electrical structure of the camera system shown in FIG. 5, in which a microcomputer $\mu C$ executes various controls over the system including a focus adjustment control and sequence controls for peripheral equipments. A lens circuit LEC is provided in the zoom lens unit 2, which sends information proper to the lens to the microcomputer $\mu C$. A focus detection circuit AFC converts input light into an electric signal, creates focus-related digital data and sends it to the microcomputer $\mu C$. A display circuit DSP includes a display panel which indicates that the subject is infocus or that focusing is impossible. A motor M provided in the camera body 1 is controlled by the microcomputer $\mu C$ via a lens driving circuit LDC to move the fourth lens group $L_4$ of the zoom lens 2. The lens driving circuit LDC receives motor speed signal, rotating direction signal and motor stop signal from the microcomputer $\mu C$, and drives the motor M accordingly. A focus encoder FENC detects rotation of the motor M and generates pulses proportional to the rotation which are sent to the microcomputer $\mu C$.

The microcomputer $\mu C$ includes a lens position counter $N_L$ which represents the absolute position of the fourth lens group $L_4$ measured from its position in at infinity. The counter $N_L$ is reset to zero when the fourth lens group $L_4$ is in at infinity, is counted up according to the pulses from the focus encoder FENC when the lens group is moved toward shorter object distance, and is counted down when the lens group is moved opposite. When the fourth lens group $L_4$ is in at the shortest distance, the lens position counter $N_L$ becomes $N_{max}$. The value $N_{max}$ varies from lens to lens, thus the value $N_{max}$ is informed from the lens circuit LEC to the body microcomputer $\mu C$.

A cathode-grounded battery BAT supplies power to the microcomputer $\mu C$ and other circuits. A time constant circuit composed of a circuit of a resistance $R_1$ and a capacitor $C_1$ is connected to the anode of the battery BAT, and the junction of the resistance $R_1$ and capacitance $C_1$ is connected to the power-on reset terminal RES of the microcomputer $\mu C$. When the power is turned on, the source voltage is applied to a terminal $V_{cc}$ of the microcomputer $\mu C$ and the microcomputer $\mu C$ is activated. But the microcomputer $\mu C$ is not operative until the capacitor $C_1$ is sufficiently charged and the voltage on the power-on reset terminal RES reaches a preset level. When the voltage reaches the level, the microcomputer $\mu C$ is reset and starts a predetermined initial operation.

Several switches are connected to the microcomputer $\mu C$. An infinity switch $S_\infty$ is turned on when the zoom lens is retracted to in at infinity. $S_M$ is the main switch of the camera body 1 and is turned on when the camera is to be used. $S_1$ is a switch to begin preparations for photographing, and is turned on by slightly pressing ("a first stroke") the release button (not shown) on the camera body 1. $S_2$ is the release switch which is turned on when the release button is fully pressed ("a second stroke"), whereby shutter release operations are started when some proper conditions are satisfied. Switch $S_{AFM}$ is to change the AF (auto-focusing) mode: when the switch $S_{AFM}$ is on, the continuous AF mode prevails, and when it is off, the single AF mode prevails.

A zoom encoder ZENC generates a digital signal representative of the rotative angle of the zooming ring 5 and send the signal to the lens circuit LEC. A switch $S_Z$ is connected to the lens circuit LEC for interchanging the normal zooming mode (in which an object at a fixed distance is kept infocus while zooming) and the constant magnification zooming mode (in which a proceeding or receding object is kept infocus with the magnification maintained constant while zooming). The lens circuit LEC includes a main circuit MC, ROM $R_M$ and an addressing circuit $A_D$. The ROM $R_M$ stores information proper to the zoom lens 2, and the addressing circuit $A_D$ designates an address of the ROM $R_M$ responsive to signals from the zoom encoder ZENC, zoom mode switch $S_Z$ and the main circuit MC. Therefore, the information transmitted from the lens circuit LEC to the body microcomputer $\mu C$ includes: focal length f, conversion coefficient K (which is used to calculate the lens movement), zoom request signal ZOOM (ZOOM = 1 when the zoom mode switch $S_Z$ is off, i.e., in the normal zooming mode, and ZOOM = 0 when $S_Z$ is on, i.e., in the constant magnification zooming mode).

GENERAL OPERATIONS

In manual focusing mode, the coupler 31 is disengaged to shut drive from the motor M and, when the focusing ring 13 is manually rotated, the shifting ring 9 moves longitudinally due to the helicoid coupling, dragging the cam ring 3. The cam ring 3 conveys the fourth lens group $L_4$ along the optical axis, whereby the focus is manually adjusted. In auto-focusing mode, the motor drive is transmitted via the coupler 31 to the focusing ring 13, which causes the longitudinal movement of the fourth lens group $L_4$ as described above. In this case, however, the movement is controlled by the microcomputer $\mu C$.

When the zoom mode switch $S_Z$ is turned on ("CONST MAG" position in FIG. 6) and a desired magnification is set by rotating (manually or by using motor) the focusing ring 13 to adjust the magnification scale 29, constant magnification zooming is effected as follows. As described above, the fourth lens group $L_4$ is moved by distance $d\beta$ from the at-infinity position depending on the set magnification. Then, when the zooming ring 5 is rotated, the cam ring 3 also rotates by means of the link pin 8. Due to the cam grooves, the front three lens groups $L_1$, $L_2$ and $L_3$ move as shown by the solid lines in FIG. 1 to vary magnification, and the fourth lens group $L_4$ moves as shown in FIG. 1 (e.g., the line B) for focusing. When an approaching or receding object is focused by the rotation of the zooming ring 5 and the release button is pressed slightly (the first stroke) to turn on the preparation switch $S_1$, more precise focus adjustment is performed by the microcomputer $\mu C$ in the single AF mode (e.g., when the AF mode switch $S_{AFM}$ is off). Then, when the release button is pressed the second stroke to turn on the release switch $S_2$, shutter is released, thus constant magnification photographing is performed.

In normal zooming mode ($S_Z$ is off), the zooming ring 5 is rotated to vary the focal length and the focusing ring 13 is manually rotated (when in the manual focusing mode) to adjust focus on an object standing at a fixed distance. However, when the AF mode is selected (in this case, continuous AF mode is forcedly set when the AF mode is selected in the normal zooming mode) and the release button is pressed the first stroke (i.e., the preparation switch $S_1$ is on), the microcomputer $\mu C$ automatically adjusts the focus while zooming by manually rotating the zooming ring 5.

DETAIL OPERATIONS

Figure 8:
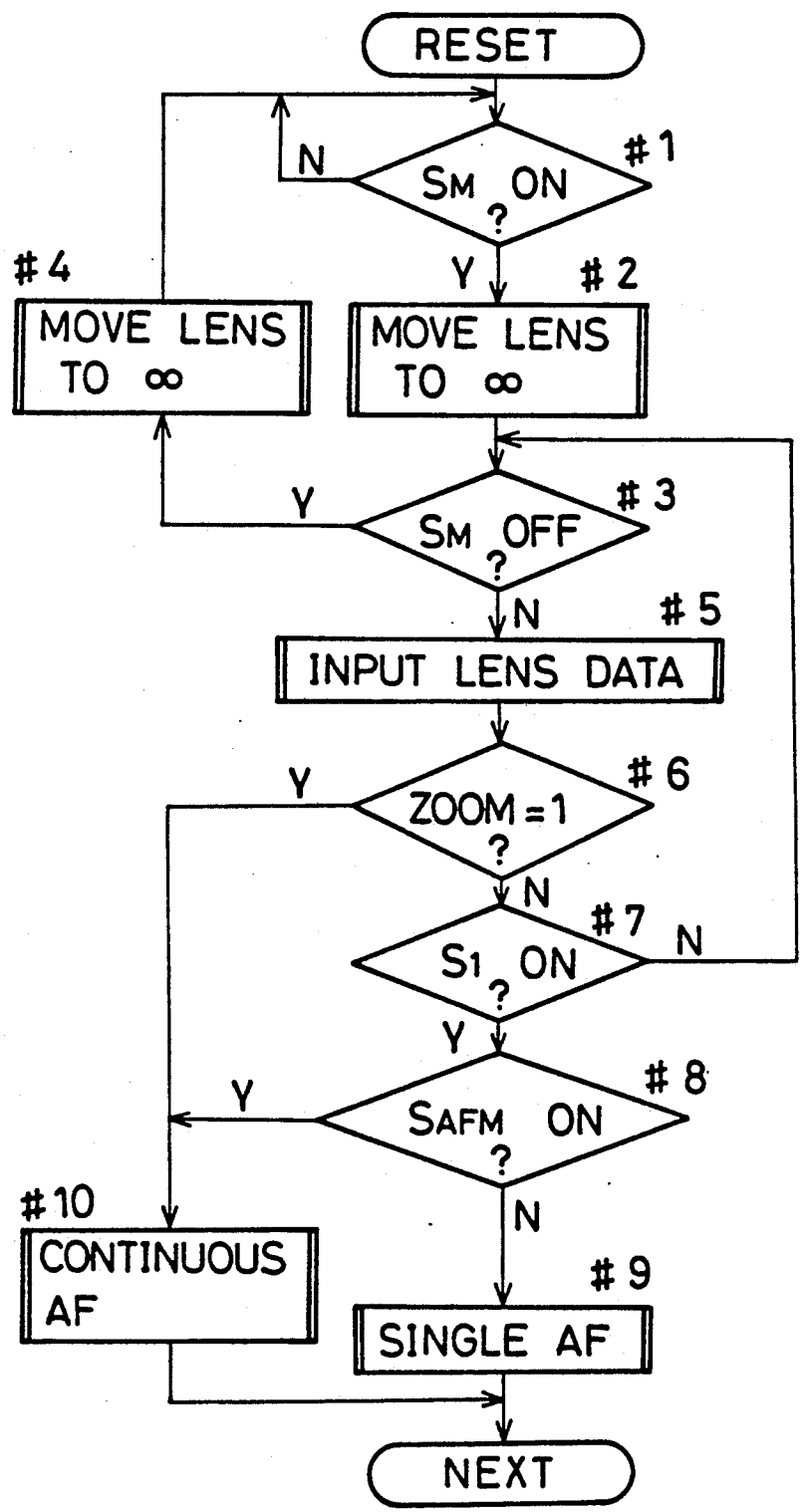
FIG. 8 is a flowchart of a routine executed by the microcomputer of the first embodiment.

The operations of the microcomputer $\mu C$ in the above zooming process are described here referring to the flowchart of FIG. 8.

When the microcomputer $\mu C$ is reset, it is determined at step #1 whether the main switch $S_M$ is on. The process waits here until the main switch $S_M$ is turned on. When the main switch $S_M$ is turned on, a subroutine is executed at step #2 to move the fourth lens group $L_4$ to the position in at infinity, followed by the decision of step #3 whether the main switch $S_M$ is off. When the main switch $S_M$ is turned off during the operation at step #3, the movement of the fourth lens group $L_4$ to in at infinity is completed at step #4 and the process returns to step #1. When the main switch $S_M$ is still on at step #3, the lens data is inputted from the lens circuit LEC at step #5. Among the data received, the value of ZOOM is determined at step #6. If the value is 1 (normal zooming), continuous AF mode is effected at step #10 irrespective of the state of the AF mode switch $S_{AFM}$. If ZOOM=0 (constant magnification zooming) at step #6, it is then determined at step #7 whether the preparation switch $S_1$ is on. When the switch $S_1$ is off, the process returns to step #3, and otherwise ($S_1$ is on) the state of the AF mode switch $S_{AFM}$ is determined at step #8. When the switch $S_{AFM}$ is on, a subroutine is executed at step #10 to set the continuous AF mode, and otherwise the single AF mode is set at step #9. In any case, the process proceeds to subsequent steps (not shown).

Figure 9:
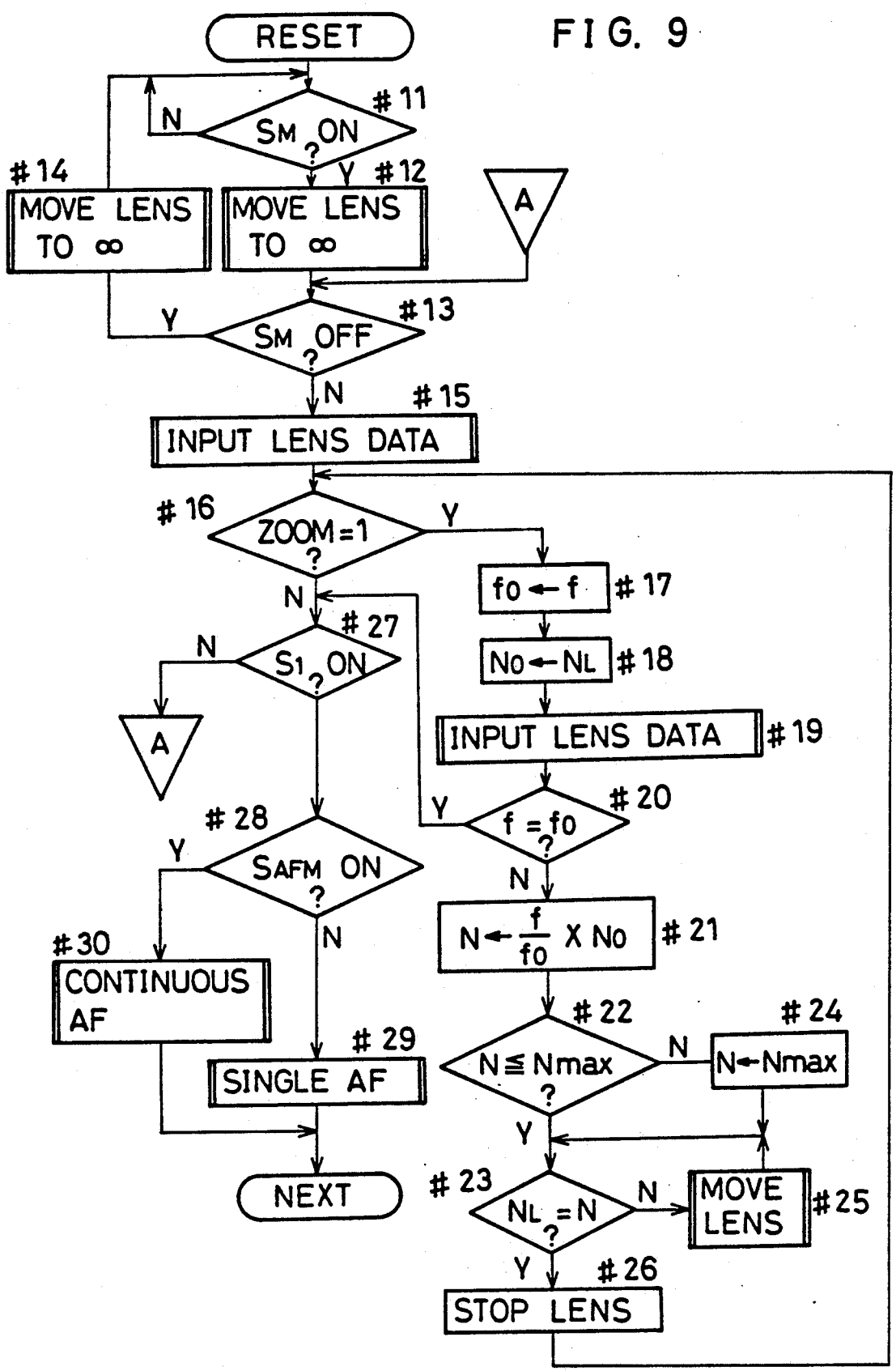
FIG. 9 is a variation of the flowchart of FIG. 8.

FIG. 9 is a variation of the flowchart of FIG. 8, in which auto-focusing during normal zooming is performed without using the focus detection circuit AFC but by using the lens position counter $N_L$. Since the value of the lens position counter $N_L$ is proportional to the rotation of the coupler 31 (thus to the movement $d\beta$ of the fourth lens group $L_4$) and $d\beta$ is proportional to the magnification $\beta$, as in equation (4), the value of the counter $N_L$ is proportional to the magnification $\beta$, as:

$$N_L = -A \cdot \beta. \tag{6}$$

Now it is provided here that the magnification is $\beta_o$ and the value of the counter $N_L$ is $N_o$ when the focal length of the zoom lens is $f_o$. When the focal length $f_o$ is changed to f, the magnification $\beta$ must change in order to keep infocus at distance D, as:

$$D = -f_o/\beta_o = -f/\beta, \tag{7}$$

and $$\beta = f \cdot \beta_o / f_o. \tag{8}$$

If the number of pulses from the focus encoder FENC is N, since $N = -A \cdot \beta$ and $N_o = -A \cdot \beta_o$, $$N = (N_o/\beta_o) \cdot \beta. \tag{9}$$

Substituting equation (8) into equation (9), $$N = (f \cdot N_o)/f_o. \tag{10}$$

which gives the number of pulses necessary to adjust focus in the new magnification condition. That is, by driving the fourth lens group $L_4$ until the lens position counter $N_L$ reaches the number N, the focus is adjusted.

From equations (6) and (7), the movement $d_D$ of the fourth lens group $L_4$ and the focal length f have the relation:

$$d_D = a \cdot f \text{ (a: constant)} \tag{10'}$$

for a fixed object distance D. Depending on design variations of the optical system, $d_D$ may be determined as:

$$d_D = b \cdot (f + f_c) \text{ or}$$

$$d_D = c \cdot (f + f_c)^2$$

(b, c, $f_c$ are constants), in which case, equation (10) will be:

$$N = \{(f + f_c) \cdot N_o\}/(f_o + f_c) \text{ or}$$

$$N = \{(f + f_c)^2 \cdot N_o\}/(f_o + f_c)^2.$$

In the above method, $\beta$ in equation (8) includes some deviation $\Delta\beta$ and it brings about a defocus $\Delta L$ as:

$$\Delta L \simeq \Delta\beta \cdot f. \tag{11}$$

Since the lens position counter $N_L$ is also used in the AF control process executed by the focus detection circuit AFC, the counter $N_L$ has sufficient defocus resolution. If, for example, the resolution $f/f_o$ of the zoom encoder ZENC is $f/f_o = 2^{1/24}$, from equation (8), $$\beta = \beta_o + \Delta\beta = 2^{1/24} \cdot \beta_o, \tag{12}$$

and $$\Delta\beta = (1 - 2^{1/24}) \cdot \beta_o. \tag{13}$$

This shows that $\Delta\beta$ becomes largest when $|\beta_o|$ becomes largest. For example, for $\beta_{max} = \max(|\beta_o|) = -0.1$, $\max(\Delta\beta) = 0.0029$. If the tolerable defocus is $\pm 0.15$ mm (0.3 mm), the focal length f is, from equation (11), $$f \leq 0.3/0.0029 = 102 (\text{mm}), \tag{14}$$

showing that objects nearer than about 100 mm distance are sufficiently focused within the tolerance.

The difference of the flowchart of FIG. 9 from that of FIG. 8 is now described. When it is determined at step #16 that ZOOM=1 (normal zooming), focal length f received at step #15 is stored in the memory of the microcomputer $\mu C$ as $f_o$ at step #17, and the current value of the lens position counter $N_L$ is also stored in the memory as $N_o$ at step #18. Then the lens data input subroutine is executed again at step #19, and it is determined at step #20 whether the newly input focal length f is equal to the stored value $f_o$. If the zooming ring 5 is not operated during steps #15 through #19, $f = f_o$ and process proceeds to step #27. If the zooming ring 5 is operated there, $f \neq f_o$ and the process proceeds to step #21 where a new target value N of the counter $N_L$ is calculated by multiplying $N_o$ by $f/f_o$, as shown in equation (10), in order to keep infocus for the new magnification. Then the new target value N is compared with the maximum value $N_{max}$ which corresponds to the foremost position of the fourth lens group $L_4$ at step #22. If $N \leq N_{max}$, the fourth lens group $L_4$ is moved by the subroutine of step #25 until the lens position counter $N_L$ reaches N at step #23. When the lens position counter $N_L$ reaches N, the lens is stopped at step #26 and the process returns to step #16. If $N > N_{max}$ at step #22, the target N is restricted to $N_{max}$ at step #24, followed by steps #23 et seq.

SECOND EMBODIMENT

Figure 10:
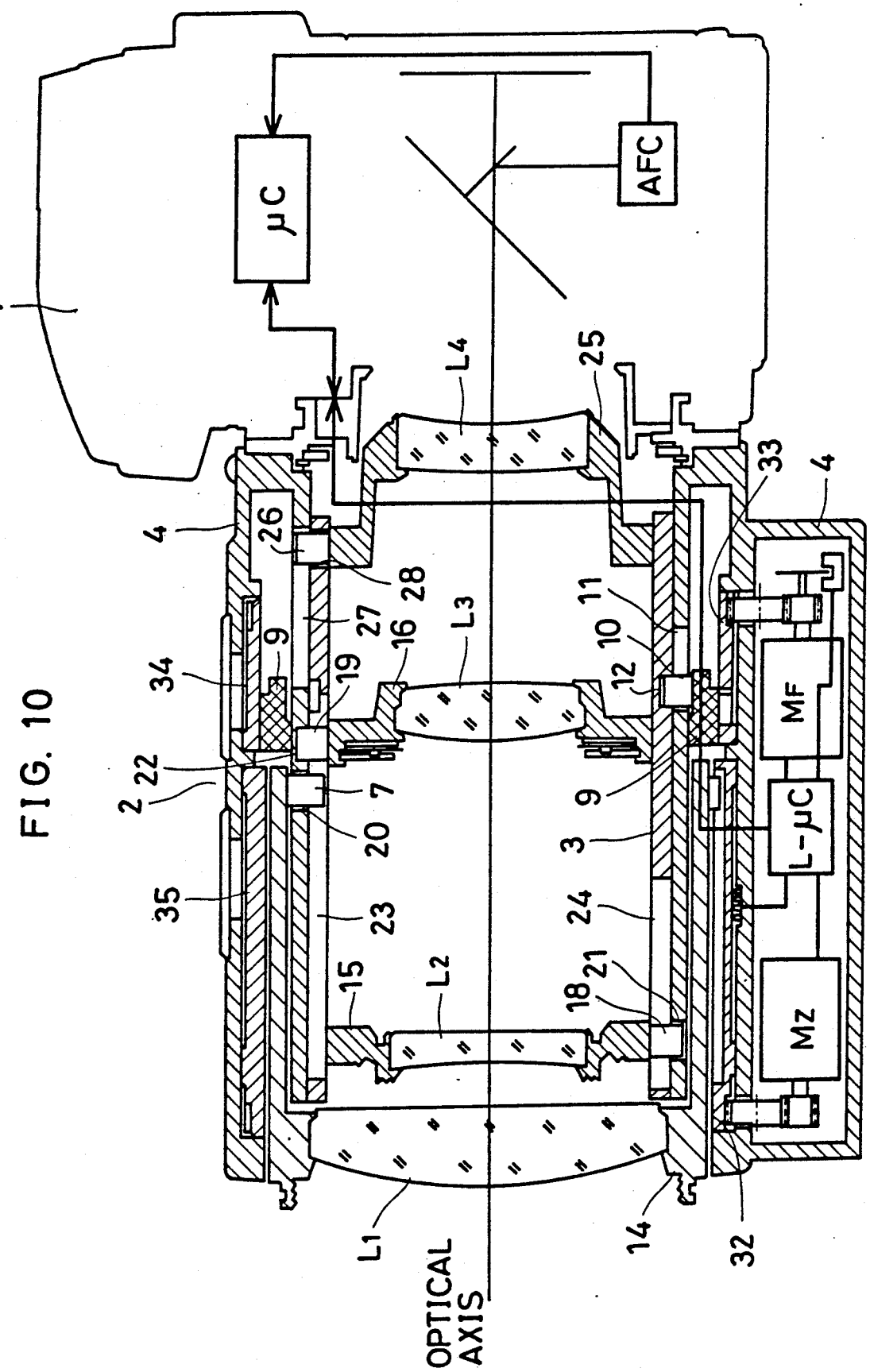
FIG. 10 is a cross sectional view of another camera system attached with a variation of the zoom lens unit shown in FIG. 5, as the second embodiment.
Figure 11:
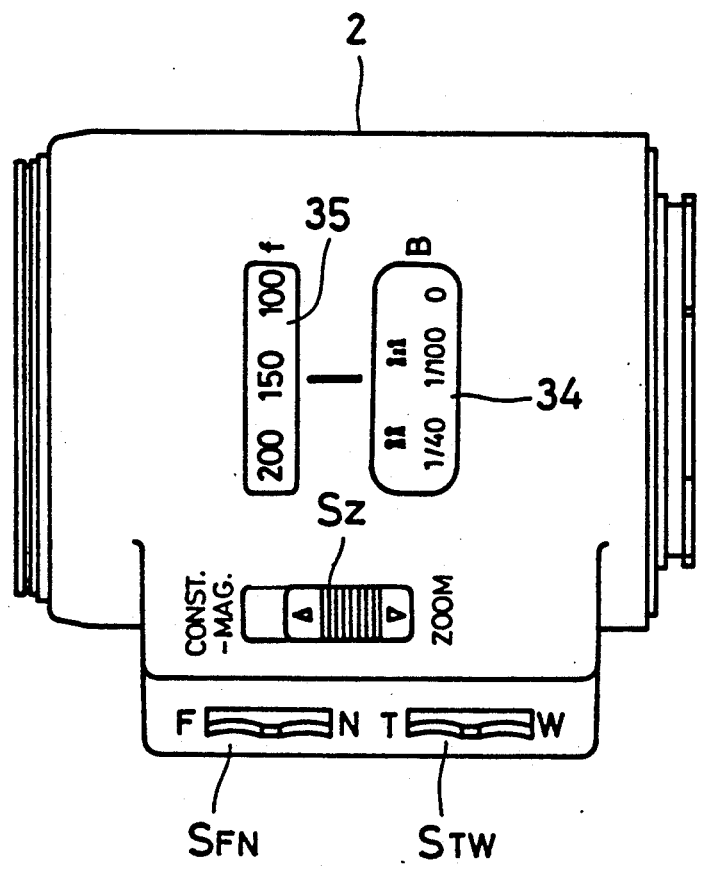
FIG. 11 is an external view of the zoom lens unit.

A variation of the camera system is shown in FIG. 10, in which a zoom motor $M_Z$ and a focus motor $M_F$ are provided in the zoom lens unit 2 instead of the zooming ring 5 and the focusing ring 13 of FIG. 5. Rotational drive of the zoom motor $M_Z$ is transmitted via a zoom gear ring 32 to the frame 14 of the first lens group $L_1$, whose longitudinal movement causes the rotational movement of the cam ring 3 and hence forces the second and third lens groups $L_2$ and $L_3$ move longitudinally. The drive of the focus motor $M_F$ is transmitted via the focus gear ring 33 to the shifting ring 9, whose longitudinal movement causes rotation of the cam ring 3. The rotation of the cam ring 3 causes the movement as shown in FIG. 1 of the fourth lens group $L_4$ along the optical axis. Also shown in FIG. 10 are a magnification scale 34 inscribed on the periphery of the focusing gear ring 33 and a distance scale 35 inscribed on the periphery of the zoom gear ring 32, as more clearly shown in the external view of FIG. 11. In FIG. 11, a zoom mode switch $S_Z$ and two spring slide switches, focusing switch $S_{FN}$ and zooming switch $S_{TW}$ are shown.

Figure 12:
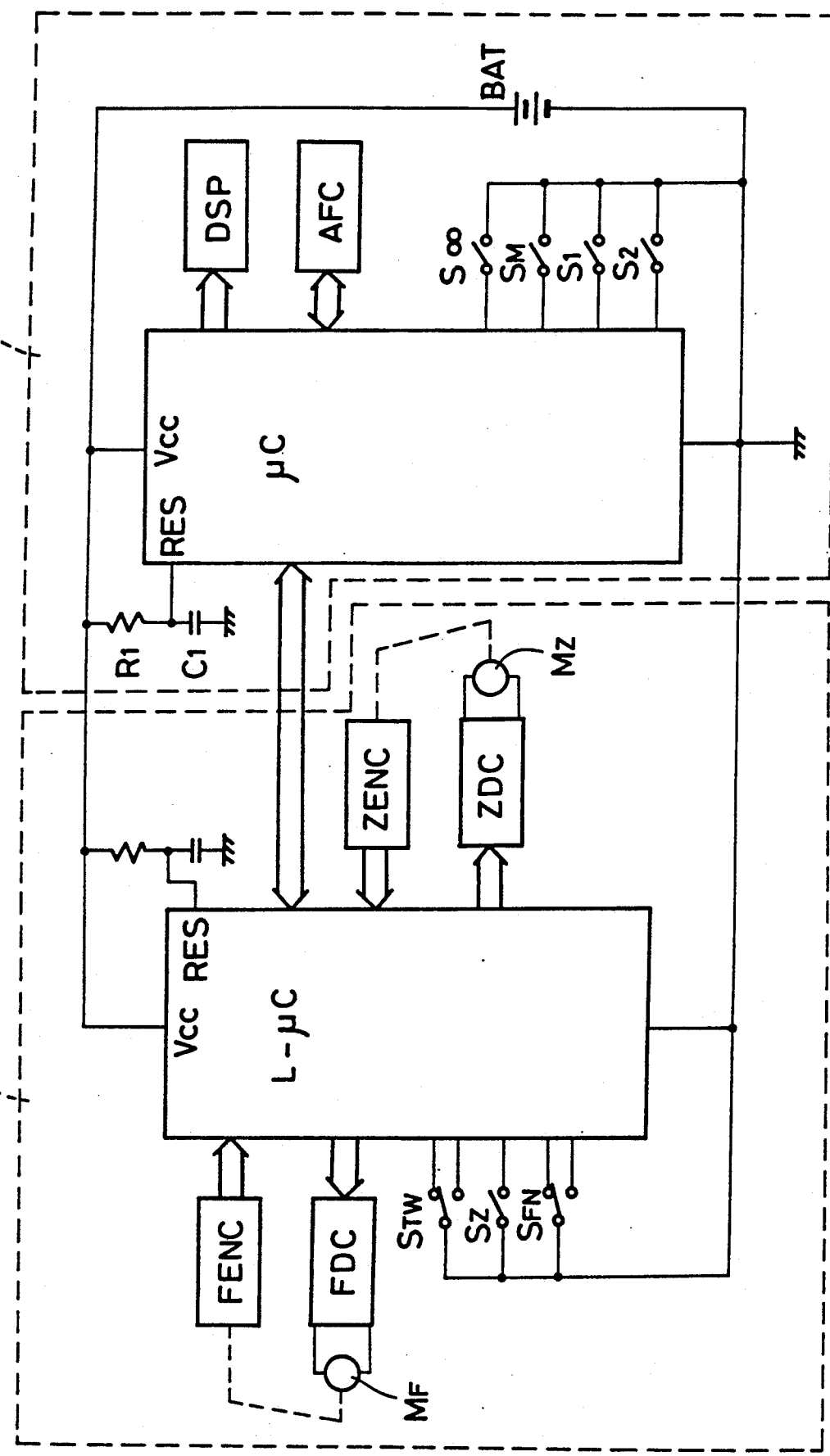
FIG. 12 is a block diagram representing the electrical system of the second embodiment.

The electrical block diagram is accordingly modified as shown in FIG. 12, in which: a microcomputer $L-\mu C$ is provided in the lens unit 2; a driver FDC and an encoder FENC are provided for the focus motor $M_F$; and a driver ZDC and an encoder ZENC are provided for the zoom motor $M_Z$. When the zooming switch $S_{TW}$ is slid to T (for "tele"; longer focal length) or W (for "wide"; shorter focal length) side while the zoom mode switch $S_Z$ is on, normal zooming operation is performed. When, on the other hand, the zooming switch $S_{TW}$ is slid to T or W side while the zoom mode switch $S_Z$ is off, constant magnification zooming is performed. In any case, focus is adjusted by sliding the focusing switch $S_{FN}$ to F (for "far") or N (for "near").

GENERAL OPERATIONS OF THE SECOND EMBODIMENT

In manual focusing mode, focus motor $M_F$ operates when the focusing switch $S_{FN}$ is slid to either side to drive the fourth lens group $L_4$ along the optical axis. In the auto-focusing mode, the operation of the focus motor $M_F$ (i.e., the movement of the fourth lens group $L_4$) is controlled by the microcomputers $\mu C$ and $L-\mu C$.

In constant magnification zooming mode, first, the focus motor $M_F$ is operated to rotate the focus gear ring 33 and a desired magnification is set on the magnification scale 34. Then the fourth lens group $L_4$ is automatically moved by a certain distance depending on the set magnification. After that, a moving (proceeding or receding) object is kept infocus by operating the zoom motor $M_Z$ to rotate the zooming ring 32.

In normal zooming mode, the zoom motor $M_Z$ is operated to vary magnification of an object standing at a fixed distance D, and, at the same time, the focus motor $M_F$ is operated to correct the shift of the focus point due to the zooming. While operating the focus motor $M_F$, its target rotating amount is calculated to keep $D = f/\beta$ constant from the focal length f and the magnification $\beta$ based on the detected data of the zoom encoder ZENC and the focus encoder FENC. The lens microcomputer $L-\mu C$ includes a lens position counter $N_f$ for the zoom motor $M_Z$ which counts up pulses generated by the zoom encoder ZENC when the lens is zoomed to longer focal length and counts down when zoomed to shorter focal length. The prescribed lens position counter $N_L$ for the focus motor $M_F$ is also provided in this embodiment. When the (zoom) counter $N_f$ is reset to zero at focal length of $f_o$, its value at focal length f is:

$$N_f = B \cdot \log_2(f/f_o), \text{ (B: a constant)} \tag{15}$$

and, substituting equation (10), the target value N of the (focus) lens position counter $N_L$ is obtained by:

$$N = N_o \times 2^{(N_f/B)},$$

where $N_o$ is the value of the (focus) counter $N_L$ when the (zoom) counter $N_f = 0$. Thus, by operating the focus motor $M_F$ to move the fourth lens group $L_4$ until the (focus) counter $N_L$ reaches N, the infocus condition is obtained.

Calculating, in the above case, according to the prescribed method, provided the tolerable defocus is ±0.18 mm (0.36 mm) at F=5.6, objects nearer than about 200 mm distance are sufficiently focused within the tolerance.

DETAIL OPERATIONS OF THE SECOND EMBODIMENT

Figure 13:
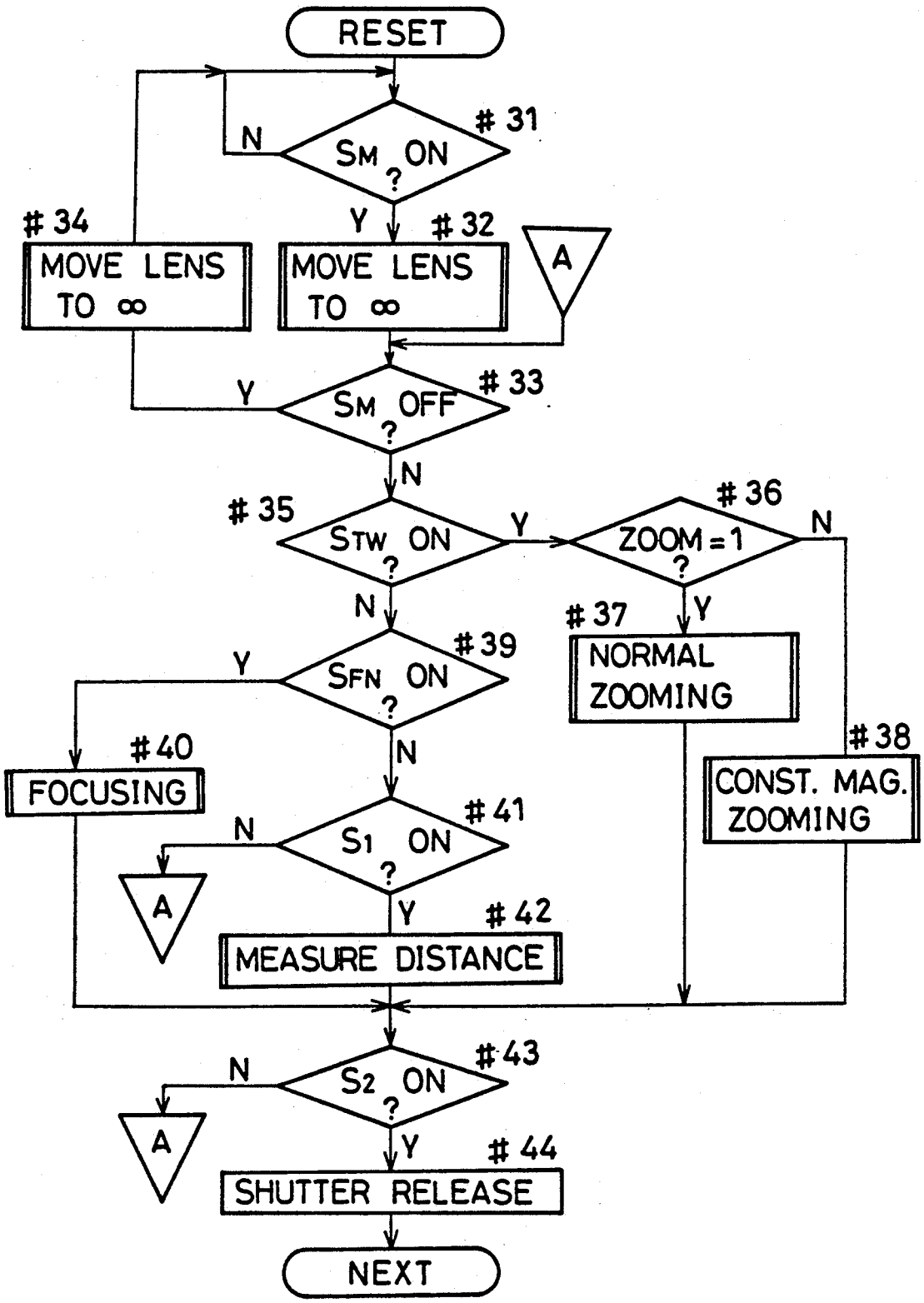
FIG. 13 is a flowchart of a routine executed by the microcomputers of the second embodiment.
Figure 14:
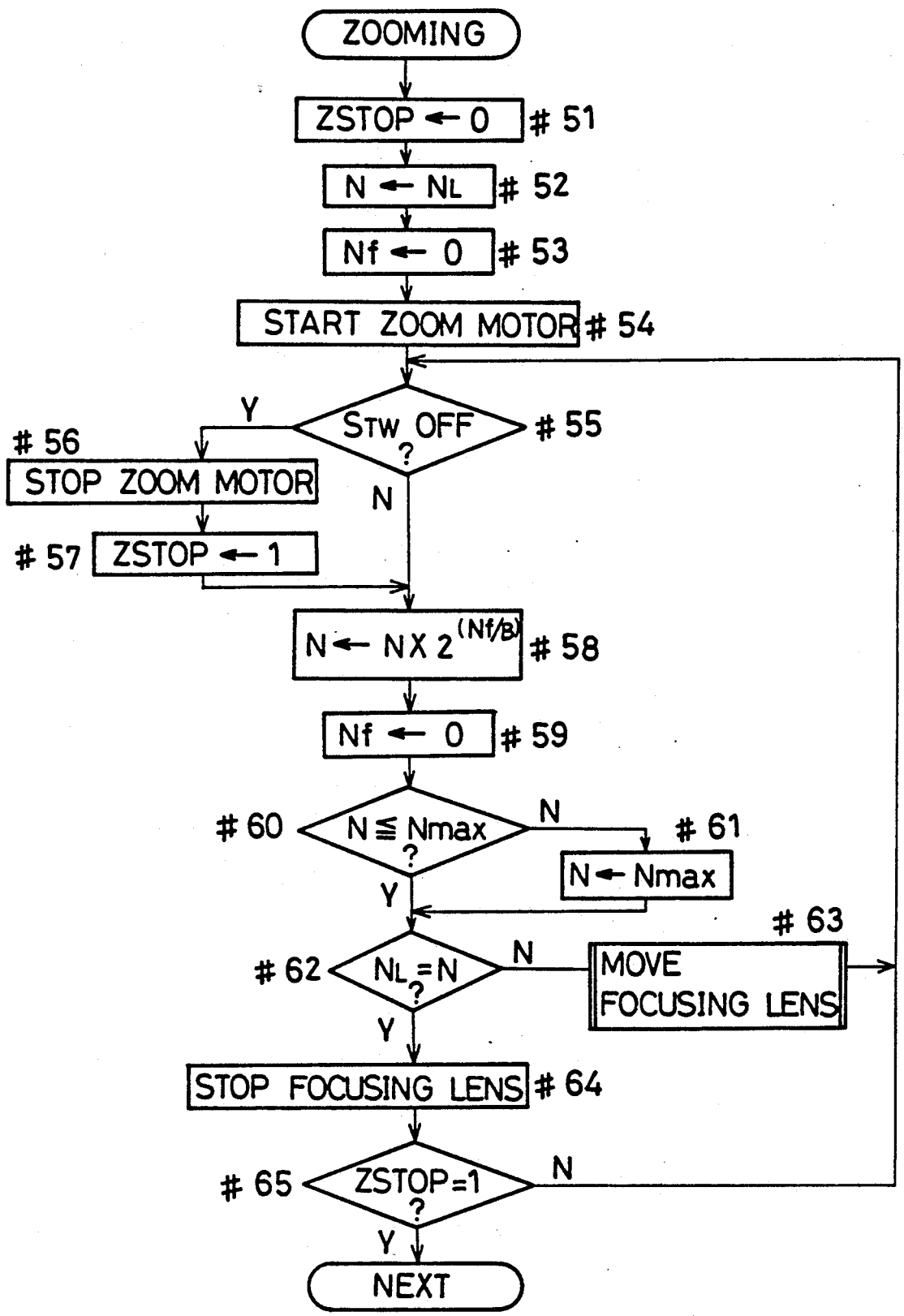
FIG. 14 is a flowchart of a subroutine for executing zooming operations of the second embodiment.

Details of the operations of the second embodiment is now explained referring to the flowcharts of FIGS. 13 and 14. Since the lens microcomputer $L-\mu C$ is subordinate to the body microcomputer $\mu C$ in this embodiment, the flowcharts describe operations of both microcomputers and omit communications between them.

When the microcomputer is reset, it is determined at the first step #31 whether the main switch $S_M$ is on. Process waits here until the main switch $S_M$ is turned on. When the main switch $S_M$ is turned on, process proceeds to step #32 where a subroutine is executed for retracting the fourth lens group $L_4$ to the position infocus at infinity. Then the main switch $S_M$ is again checked at step #33: if the main switch $S_M$ is turned off while the fourth lens group $L_4$ is being retracted at step #32, the operation is completed at step #34 and the process returns to step #31. If the main switch $S_M$ is still on at step #33, it is determined at step #35 whether the zooming switch $S_{TW}$ is on (when the switch $S_{TW}$ is slid to either side, it is denoted here as "the zooming switch $S_{TW}$ is on"). When the zooming switch $S_{TW}$ is on, the value of the zoom request signal ZOOM is determined at step #36: if ZOOM=1, normal zooming operations are performed at step #37; and if ZOOM=0, constant magnification zooming operations are performed at step #38. In constant magnification zooming mode, the zoom motor $M_Z$ is operated until the zooming switch $S_{TW}$ is turned off (i.e., is returned to center). Then it is determined at step #43 whether the release switch $S_2$ is on. If the release switch $S_2$ is on, shutter release operations are performed at step #44 and subsequent processes are executed thereafter. Otherwise (when release switch $S_2$ is off), the process returns to step #33. When the zoom switch $S_{TW}$ is off (i.e., the switch $S_{TW}$ is at center) at step #35, it is then determined at step #39 whether the focusing switch $S_{FN}$ is on (when the switch $S_{FN}$ is slid to either side, it is denoted here as "the focusing switch $S_{FN}$ is on"). When the switch $S_{FN}$ is on, a focusing subroutine is executed at step #40, in which the focus motor $M_F$ is operated until the focusing switch $S_{FN}$ is turned off (i.e., is returned to center). When the focusing switch $S_{FN}$ is off at step #39, it is determined at step #41 whether the preparation switch $S_1$ is on. If the preparation switch $S_1$ is off, the process returns to step #33, and otherwise an object-distance measurement subroutine is executed at step #42, followed by the step #43.

FIG. 14 is the flowchart for the zooming subroutine. First a flag ZSTOP is reset to zero, which means that the zoom motor $M_Z$ is inoperative. Current value of the (focus) lens position counter $N_L$ is inputted and stored in the memory as N at step #52, and the (zoom) lens position counter $N_f$ is reset to zero at step #53. Then the zoom motor $M_Z$ is started at step #54 whose rotating direction accords to the slid position (T or W) of the zooming switch $S_{TW}$. At the subsequent step #55, it is determined whether the zoom switch $S_{TW}$ is turned off.

If the switch $S_{TW}$ is turned off, the zoom motor $M_Z$ is deenergized at step #56 to stop zooming, and the flag ZSTOP is set to 1 at step #57. If the zooming switch $S_{TW}$ is still on at step #55, or after step #57, the stored value N of the (focus) lens position counter $N_L$ is read out and multiplied by $2^{(Nf/B)}$ at step #58 to obtain the target counter value N necessary to keep up the focus during zooming. Then the (zoom) lens position counter $N_f$ is reset to zero at step #59, and the calculated target value N is compared at step #60 with the maximum value $N_{max}$: if N exceeds $N_{max}$, the target N is restricted to $N_{max}$ at step #61. After step #60 or #61, it is determined at step #62 whether the (focus) lens position counter $N_L$ equals the target value N. If $N_L \neq N$, the fourth lens group $L_4$ is moved at step #63, followed by step #55. When the counter $N_L$ reaches the target value N, the fourth lens group $L_4$ is stopped at step #64 because focusing is achieved. Then it is determined at step #65 whether the flag ZSTOP is set (ZSTOP=1). When ZSTOP≠1, showing that the zoom motor $M_Z$ is still operating, the process returns to step #55, and otherwise the process proceeds to subsequent steps.

What is claimed is:

1. A camera operable in two zooming modes, a first zooming mode in which a magnification of an object which is infocus is maintained constant during zooming and a second zooming mode in which an object standing at a fixed distance is kept infocus during zooming, the camera comprising:
   mode selecting means for selecting one of the first and second zooming modes;
   a lens group for projecting an image of an object onto an image plane with various focal lengths;
   lens movement controlling means operable in the first and second zooming mode for determining a position of the lens group so that the magnification of an object which is infocus is maintained constant during zooming; and
   correcting means operable only in the second zooming mode for correcting said position of the lens group that is determined by the lens movement controlling means so that an object standing at a fixed distance is kept infocus during zooming.

2. The camera according to claim 1, where the lens group comprises a first lens group and a second lens group having a same optical axis as that of the first lens group and placed on an object side of the first lens group, and the lens movement controlling means comprises:
   first positioning means for determining a first position of the first lens group on the optical axis so that the magnification by the first lens group has a preset relationship with a focal length of the lens group;
   second positioning means for determining a position of the second lens group on the optical axis so that
   (a) an object at infinity is focused on an object point of the first lens group that is in the first position and focusing on an image plane, and
   (b) a compound focal length of the first lens group and the second lens group becomes the focal length of the lens group and
   adjusting means for shifting the first lens group along the optical axis from the first position by a distance depending on a preset magnification.

3. The camera according to claim 2, where a relationship used in the first positioning means is:

$$f/(1-\beta_2^2) = C,$$

where f is the focal length of the lens group, $\beta_2$ is the magnification by the first lens group hen the lens group is infocus at an object at infinity, and C is a constant.

4. The camera according to claim 3, where the shifted distance of the first lens group moved by the adjusting means is a product of the preset magnification $\beta$ and the constant C.

5. The camera according to claim 2, where said correction means comprises:
   first focal-length detecting means for detecting a first focal length of the lens group and a position of the first lens group when an object standing at a fixed distance is focused by the lens group;
   second focal-length detecting means for detecting a second focal length of the lens group when the focal length of the lens group is changed; and
   focus adjusting means for moving the first lens group based on the detected first and second focal lengths and the position of the first lens group so that the standing object is kept infocus while the focal length is changed.

6. The camera according to claim 1, where said correction means includes continuous auto-focusing means for keeping a moving object infocus, and corrects the position of the lens group by the continuous auto-focusing means.

7. The camera according to claim 1, where the camera further comprises
   auto-focusing means provided in the camera and operable in two modes, one being a continuous auto-focusing mode in which an object is kept infocus after the object is once focused, and the other being a one-shot auto-focusing mode in which the focusing operation is stopped once an object is focused and
   auto-focusing mode selecting means for selecting one of the continuous auto-focusing mode and the one-shot auto-focusing mode, wherein and
   the correction means comprises controlling means for controlling the auto-focusing mode selecting means so that the auto-focusing mode selecting means selects the continuous auto-focusing mode in the second zooming mode.

8. A zoom lens for keeping a moving object focused on an image plane maintaining a preset magnification while a focal length of said zoom lens is varied, said zoom lens comprising:
   a first lens group;
   a second lens group having a same optical axis as that of the first lens group and places on an object side of the first lens group;
   first positioning means for determining a first position of the first lens group on the optical axis so that the magnification by the first lens group has a preset relationship with a focal length of said zoom lens;
   second positioning means for determining a position of the second lens group on the optical axis so that
   (a) an object at infinity is focused on an object point of the first lens group that is in the first position and focusing on an image plane, and
   (b) a compound focal length of the first lens group and the second lens group becomes the focal length of said zoom lens; and
   adjusting means for shifting the first lens group along the optical axis from the first position by a distance depending on the preset magnification.

9. The zoom lens according to claim 8, where a relationship used in the first positioning means is:

$$f/(1-\beta_2^2)=C.$$

where f is the focal length of the zoom lens, $\beta_2$ is the magnification by the first lens group when the zoom lens is infocus at an object at infinity, and C is a constant.

10. The zoom lens according to claim 8, where the shifted distance of the first lens group moved by the adjusting means is the product of the preset magnification $\beta$ and the constant C.

11. The zoom lens according to claim 8, where the first lens group has a fixed focal length.

12. The zoom lens according to claim 8, where the focal length of the first lens group varies according to the focal length of the zoom lens.

13. A zoom lens for keeping a moving object focused on an image plane maintaining a preset magnification while a focal length of said zoom lens is varied, said zoom lens comprising:
   a first lens group;
   a second lens group having a same optical axis as that of the first lens group and placed on an object side of the first lens group;
   a third lens group having the same optical axis as that of the first lens group and placed on an image side of the first lens group;
   first positioning means for determining a first position of the first lens group on the optical axis so that the magnification by the first lens group has a preset relationship with a focal length of said zoom lens;
   second positioning means for determining a position of the second lens group on the optical axis so that
   (a) an object at infinity is focused on an object point of the first lens group that is in the first position and focusing, in combination with the third lens group, on an image plane, and
   (b) a compound focal length of the first, the second and the third lens groups becomes the focal length of said zoom lens; and
   adjusting means for shifting the first lens group along the optical axis from the first position by a distance depending on the preset magnification.

14. The zoom lens according to claim 13, where a relationship used in the first positioning means is:

$$f/\{(1-\beta_2^2)\beta_3^2\}=C$$

where f is the focal length of the zoom lens, $\beta_2$ is the magnification by the first lens group when the zoom lens is infocus at an object at infinity, $\beta_3$ is the magnification by the third lens group when the zoom lens is infocus at an object at infinity, and C is a constant.

15. The zoom lens according to claim 14, where the shifted distance of the first lens group moved by the adjusting means is the product of the present magnification $\beta$ and the constant C.

16. The zoom lens according to claim 13, where the first lens group has a fixed focal length.

17. The zoom lens according to claim 13, where the focal length of the first lens group varies according to the focal length of the zoom lens.

18. A camera including a zoom lens for keeping a moving object focused on an image plane maintaining a preset magnification while a focal length of the zoom lens is varied, the camera comprising:

a first lens group;

a second lens group having a same optical axis as that of the first lens group and placed at an object side of the first lens group;

first positioning means for determining a first position of the first lens group on said optical axis so that a magnification by the first lens group has a preset relationship with a focal length of the zoom lens;

second positioning means for determining a position of the second lens group on said optical axis so that (a) an object at infinity is focused on the object point of the first lens group that is in the first position and focusing on an image plane, and (b) the compound focal length of the first lens group and the second lens group becomes the focal length of the zoom lens; and adjusting means for shifting the first lens group along the optical axis from the first position by a distance depending on the preset magnification.

19. The camera according to claim 18, where a relationship used in the first positioning means is:

$$f/(1-\beta_2^2)=C,$$

where f is the focal length of the zoom lens, $\beta_2$ is the magnification by the first lens group when the zoom lens is infocus at an object at infinity, and C is a constant.

20. The camera according to claim 19, where the shifted distance of the first lens group moved by the adjusting means is a product of the preset magnification $\beta$ and the constant C.

21. The camera according to claim 18, where the first lens group has a fixed focal length.

22. The camera according to claim 18, where the focal length of the first lens group varies according to the focal length of the zoom lens.

23. A camera to which a zoom lens is attachable comprising:

auto-focusing means provided in the camera and operable in two modes, a continuous auto-focusing mode in which an object is kept infocus after the object is once focused, and a one-shot auto-focusing mode in which a focusing operation is stopped once an object is focused;

zoom lens discriminating means for detecting whether a zoom lens attached to the camera needs focus compensation during zooming; and automatic mode setting means for selecting the continuous auto-focusing mode when the zoom lens attached to the camera needs focus compensation.

24. The camera according to claim 23, where the zoom lens comprises data sending means for sending data corresponding to the zoom lens to the camera, and the discriminating means of the camera detects that the zoom lens needs focus compensation based on the data from the data sending means.

25. A zoom lens comprising:
a zooming optical system for varying a focal length;
a focusing lens;

magnification setting means for setting a magnification;

first positioning means for determining a position of the focusing lens shifted from a position of infocus condition of an object at infinity by a distance corresponding to a magnification set by the magnification setting means during a zooming operation of the zooming optical system; and second positioning means for determining a position of the focusing lens so that an object to be magnified on the basis of the set magnification is always in-focus in the position of the focusing lens determined by the first positioning means during a zooming operation of the zooming optical system.

26. A zoom lens according to claim 25 which further comprises display means for displaying a set magnification by displaying a position of the focusing lens.

27. A zoom lens according to claim 25 wherein the shifted distance corresponding to the set magnification is represented as function of the set magnification and a constant C.

28. A zoom lens according to claim 27 wherein the shifted distance is represented as a product of the set magnification and the constant C.

29. A zoom lens according to claim 28 wherein the first positioning means determines the position of the focusing lens so that the following condition is satisfied:

$$f/(1-\beta_2^2)=C$$

wherein
f: a focal length,
$\beta_2$: a magnification of the focusing lens, and
C: a constant.

30. A zoom lens comprising:
a zooming optical system for varying a focal length;
a focusing lens;
magnification setting means for setting a magnification; and
positioning means for positioning the focusing lens at a point shifted from a position of in-focus condition of an object at infinity by a distance corresponding to the set magnification, the distance having no relation with a focal length.

31. A zoom lens according to claim 30 wherein the shifted distance corresponding to the set magnification is represented as function of the set magnification and a constant C.

32. A zoom lens according to claim 31 wherein the shifted distance is represented as a product of the set magnification and the constant C.

33. A zoom lens according to claim 32 wherein the positioning means determines the position of the focusing lens so that the following condition is satisfied:

$$f/(1-\beta_2^2)=C$$

wherein
f: a focal length,
$\beta_2$: a magnification of the focusing lens, and
C: a constant.

* * * * *